July 8, 1958  H. HILLMAN  2,842,729
INDUCTION MOTOR
Filed June 18, 1953  3 Sheets-Sheet 1
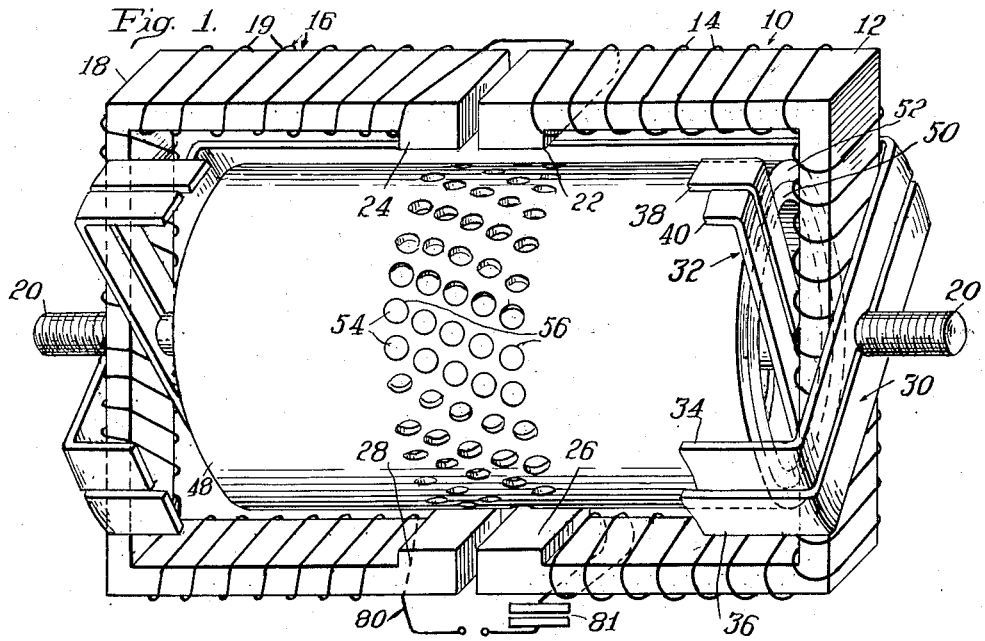
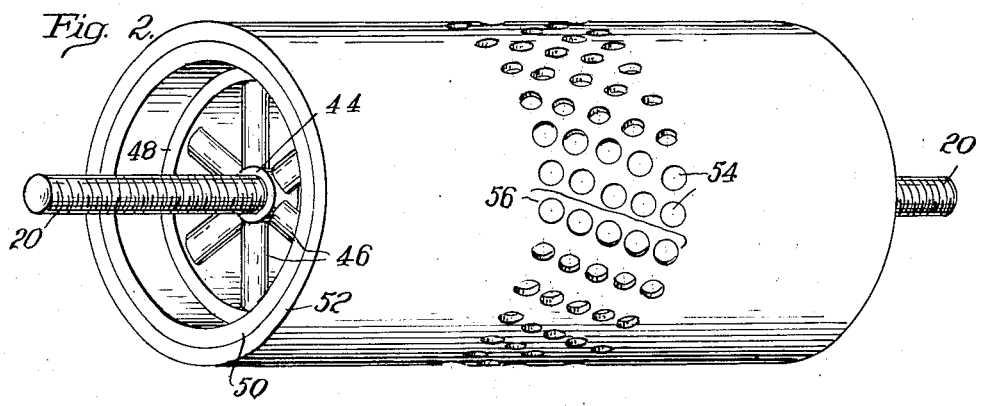
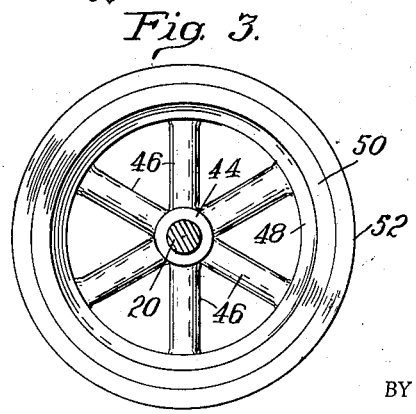
INVENTOR
Herbert Hillman
BY
ATTORNEY July 8, 1958

H. HILLMAN 2,842,729

INDUCTION MOTOR

Filed June 18, 1953

INVENTOR
Herbert Hillman

BY Sylvester J. Liddy
Arthur L. Nathanson
ATTORNEY

July 8, 1958  H. HILLMAN  2,842,729
INDUCTION MOTOR
Filed June 18, 1953  3 Sheets-Sheet 3

INVENTOR
Herbert Hillman
BY
ATTORNEY

United States Patent Office 2,842,729
Patented July 8, 1958

2,842,729
INDUCTION MOTOR
Herbert Hillman, Boston, Mass.
Application June 18, 1953, Serial No. 362,645
14 Claims. (Cl. 318—220)

This invention relates to improvements in motors, and particularly to a single phase induction motor.

As is commonly known an ordinary single phase induction motor is not self-starting unless there is employed a split phase arrangement or a separate starting circuit and an automatic switch arrangement for cutting out the starting circuit after the motor has started. Also, single phase induction motors cannot be started under load. This is due to the inability to produce a rotating field in the primary of the induction motor without splitting the phase in some manner to create out-of-phase current or without utilizing a separate field winding for starting. Single phase motors as a result are somewhat inefficient and contain components which are used solely in starting the motor. When the motor is operating, these components are of no value, with the exception of a capacitor which might serve to correct the power factor. Such components may be considered to be dead weight under normal operating conditions.

It is an object of this invention to provide a single-phase induction motor having a single primary circuit, yet which will start under load.

A further object of this invention is to provide a single phase motor embodying a short circuited rotor assembly in which current is generated by induction in such a manner as to produce high starting torque by reaction of stator and rotor fields.

Yet another object of this invention is to produce an induction motor in which high starting torque is produced by reaction of dual secondary currents. A motor constructed in accordance with my invention compares favorably with a three-phase induction motor in general efficiency, due to the fact that there is no dependence upon impedance to produce starting torque. All secondary currents are induced in active motor circuits without the use of wasteful auxiliary windings.

These and other objects and advantages will become apparent from the following description of the present invention illustrated in the accompanying drawing, in which:

Figure 1 is a perspective side elevational view showing a rotor and field segments constructed in accordance with the invention;

Figure 2 is a perspective side elevational view of a rotor constructed in accordance with the invention;

Figure 3 is an end elevational view of the rotor of Fig. 2;

Similar reference characters represent similar parts in the several figures.

Figure 4:
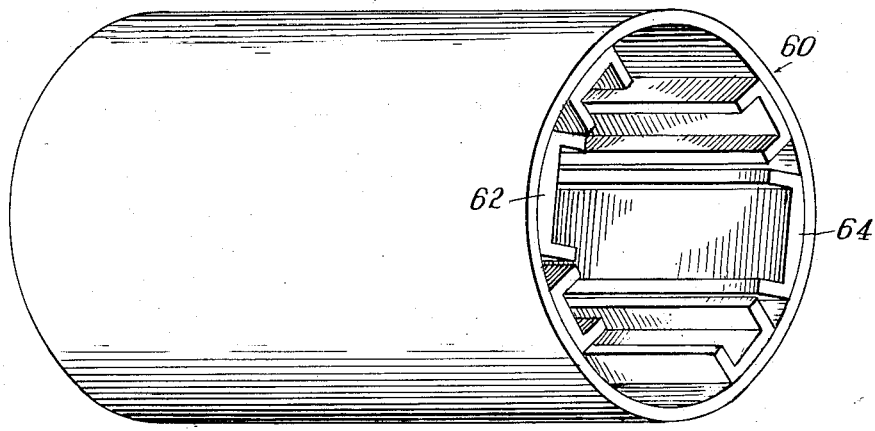
Figure 4 is a perspective view of a stator frame constructed in accordance with the invention.

Referring now to the drawings, particularly to Figure 1, reference character 10 indicates a primary stator element comprising a laminated core 12, and windings 14. Reference character 16 indicates another primary stator element comprising another laminated core 18 and windings 19. Segments 10 and 16 are each provided with an opening adapted to receive a rotor shaft 20. Each of the elements 10 and 16 can be mounted on the rotor shaft by being slid along the shaft from one end of the rotor toward the center thereof.

As shown, the segments 16 each have downwardly and upwardly extending pole faces, such as 22, 24, 26 and 28. The pole faces of primary segment 10 lie closely adjacent the pole faces of segments 16, when the motor is fully assembled. The windings 14 and 19 are connected in series so that at given instances the polarity of poles 22 and 24 will be the same and the polarity of poles 26 and 28 will be opposite thereto.

The secondary circuit for the motor includes a secondary circuit formed in the rotor itself, which will be described hereinafter, an exterior secondary stator circuit 30 and an interior secondary circuit 32. Both secondary circuits are divided into two equal segments such as 34, 36, 38 and 40. This is done to facilitate assembly.

Each of the segments 34, 36, 38 and 40 is provided with an opening 42 for reception of the rotor shaft 20. Each of the secondary stator circuits may comprise windings of wire shaped in the form of the circuits as shown in the drawings, and extending longitudinally therealong. Of course, solid segments of a conducting material may be utilized in place of a wound construction. Also, it is obvious that any laminated structure may be employed.

The rotor constructed in accordance with the invention is particularly unique. It comprises a longitudinal extending shaft 20. One or more iron wheels have a hub 44 secured to shaft 20 with spokes 46 extending outwardly from the hub to a rim 48. The wheel is formed of iron having sufficient strength and of as low a reluctance as possible.

Mounted concentrically with the rim of the wheel or wheels and attached thereto is iron cylinder 50. The iron cylinder can be attached to the wheels in any convenient manner. However, in the embodiment of the invention disclosed, bolts are used which will be hereinafter described.

A copper cylinder 52 is mounted on the iron cylinder 50, and extends therealong. Centrally of the longitudinal axis of the rotor there are disposed a number of iron bolts 54, which extend through the copper cylinder, the iron cylinder and into the iron wheel rim. The bolts are welded to the latter three elements. The bolts it should be noted, are arranged in rows 56, extending across the face of the rotor. The rows assume an acute angle with respect to the longitudinal axis of the rotor. The bolts can be said to extend around the equator of the rotor with wide copper margins on both sides.

Figure 5:
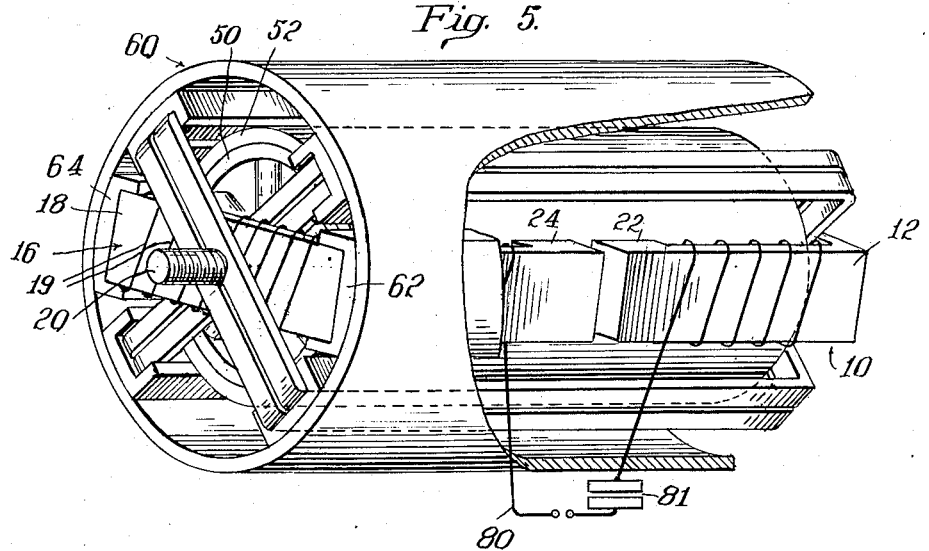
Figure 5 is a perspective view of a motor constructed in accordance with the invention with some elements being cut away for clarity.
Figure 6:
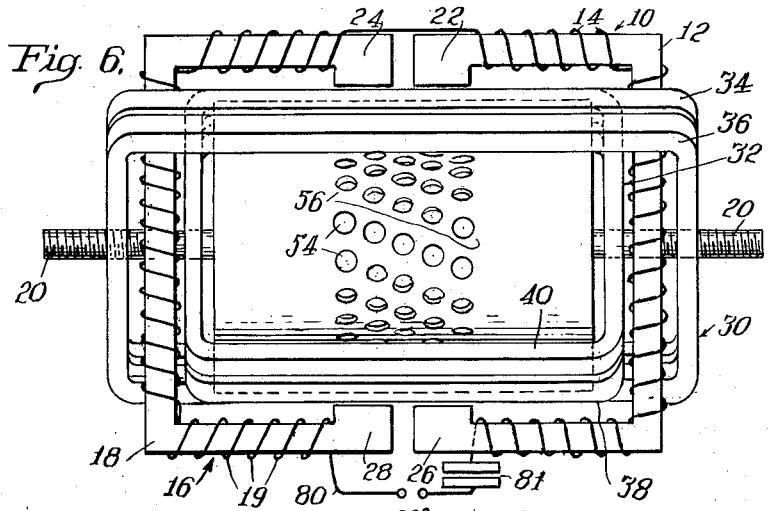
Figure 6 is a side elevational view of a motor illustrative of the invention.
Figure 7:
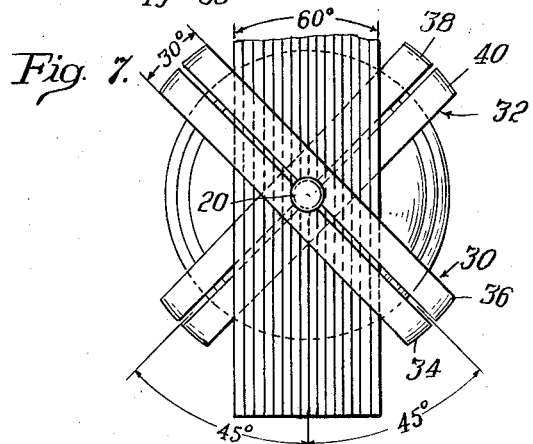
Figure 7 is an end elevational view thereof.
Figure 8:
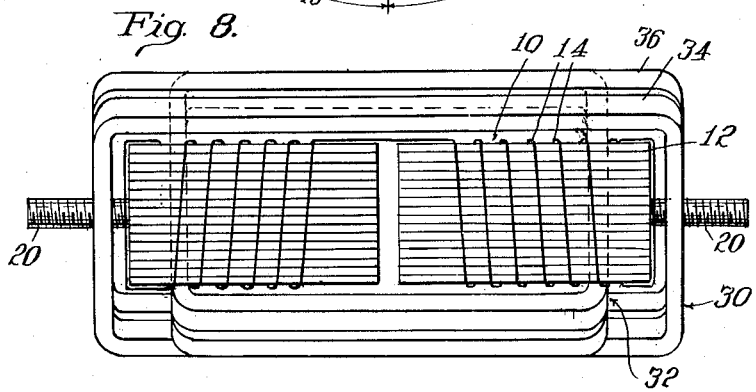
Figure 8 is a top elevational view thereof.

As illustrated in Figure 1, when the primary and secondary stator elements are assembled with the rotor, the iron bolts lie intermediate the opposite pairs of poles 22, 24 and 26, 28. The iron bolts serve to provide a path for the magnetic flux of the primary poles. Figures 4 and 5 illustrate the stator construction and the assembly of the previously described elements within the stator frame.

As shown in Figure 4, the stator comprises a generally cylindrical open-ended member 60. Mounted within the stator are opposed channels 62 and 64 which are on diametrically opposite faces of the cylinder and are secured thereto in any convenient manner, as by welding. The channels extend completely along the interior surfaces of the stator member. Two additional sets of diametrically opposed channels are also provided.

They are channels 66, and 68, and channels 70 and 72. These channels are likewise secured to the inner face of the stator member 60, and extend longitudinally therealong. Each of the channels comprise a base, such as 74 and two upstanding legs 76 and 78.

As illustrated in Fig. 5, when the motor is completely assembled, the primary stator elements, such as 16, are received within the channel members 62 and 64. The exterior secondary circuit is mounted within the channels 70 and 72 and interior secondary circuit is mounted within channels 66 and 68.

As illustrated in Fig. 1 the primary winding 10 constitutes the sole winding for the motor. The winding may be connected to the power line at 80. A capacitor 81 may be used if desired. The interior and exterior secondary stator circuits have currents induced in them by the primary as does the rotor. No exciter windings or other windings are used on the secondary stator circuits.

In order to completely disclose the instant invention, the following explanation of the manner in which the motor operates is given:

At starting the current of power line 80 passes through the primary windings 14 and 19. Magnetic flux therefore flows through both primary cores 12 and 18. The flux flows generally parallel to rotor shaft 20 along the sides of the rotor, and terminates at the poles 22, 24, 26 and 28. The poles may be termed as being two south poles 22, 24 and two north poles 26, 28. The flux next passes through the rotor core 52 and bolts 54 at right angles to the shaft 20. Secondary currents are induced in the following circuits: the circuit of rotor 52, in field circuit 32 and exterior field circuit 30. All secondary currents flow parallel to rotor shaft 20 along the side of the rotor. The rotor current in rotor cylinder 52 flows at 90° to primary poles 22, 24 and 26, 28, and induces an opposing magnetomotive force (flux) in rotor cylinders 50 and 52. The interior and exterior field currents of circuits 30 and 32 flow at right angles to each other and at an angle of 45° with respect to the primary poles 22, 24 and 26 and 28.

The induced currents in circuits 42 and 32 flow in the same direction, while induced current in circuit 30 flows in the opposite direction. Thus it will be seen that circuit 32 always attracts circuit 52, while circuit 30 repels the induced current in rotor 52. The simultaneously induced secondary currents react to produce a high starting torque.

At 3450 R. P. M. the primary poles 22, 24, and 26, 28 react with energized rotary cylinders 52 and 50 to provide additional torque. At starting the induced rotor current is mechanically displaced by 90° from the primary poles. However, at 3450 R. P. M., 60 c. the rotor current moves nearly 90° to a position in front of poles. Thus, magnet and current react to produce torque. At starting these are in no position to produce torque.

The primary flux in primary cores 12 and 18 and the secondary currents in circuits 30 and 32 flow around the rotor 52 longitudinally, although the magnetic flux in each half of the primary assembly flows in opposite directions.

The interior field circuit 32 and rotor cylinder 52 bear the same relationship to the path of primary flux 12 and 18 and therefore the induced secondary currents in these respective circuits flow in the same direction. The exterior field circuit 30 bears an opposite relationship to the path of primary flux 12 and 18 and therefore the induced secondary current in circuit 30 flows in an opposite direction to the currents in circuits 32 and 52.

The current of the interior circuit 32 is generated by the flow of primary flux through segments 12 and 18 by-passing the outside circumference of circuit 32 at 90°. The current of the exterior circuit 30 is generated by the flow of primary flux by-passing inside circumference of circuit 30 at 90°. Thus opposing currents are generated in circuit 32, rotor 52 and circuit 30, respectively.

In other words, an induced electromotive force is created by the flow of magnetic flux in the primary cores. The E. M. F. thereby generated acts at 90° to the flux. The secondary current differs in phase by 180° from the primary current. However, it may seem strange that the secondary current of circuit 30 differs in phase by 180° from the secondary currents in circuits 32 and 52. This phenomenon is explained by the fact that a flow of magnetic flux induces an opposing E. M. F. on each side. For example, in an ordinary transformer, the induced current flows around the core. Therefore, it will be seen that the current in each segment of a conductor flows in the opposite direction from the diametrically opposite segments. It is this principle which is utilized to induce opposing currents. The reason why circuits 30 and 32 extend at an angle of 45° to the flow of magnetic flux is that these field circuits must be in a position to react with the rotor current in order to produce a high starting torque (30 and 32 displaced 90° respectively and 45° from 50). A copper and iron cylinder is more efficient than a squirrel cage rotor.

Adjacent positions of active portions of circuits 32 and 30 differ by 180° with respect to flow of magnetic flux 12—18. Rotor 52 bears a similar inductive relationship to primary as circuit 32. The inductive action of rotor flux 50 is in conjunction with that of primary flux 12—18 with respect to rotor circuit 52. As a further explanation it should be noted that in reference to the phenomenon by which the induced secondary currents differ in phase by 180° respectively, a comparison is made with a transformer, the secondary current of which flows around the core. The current in each conductor segment flows in an opposite direction from that in the diametrically opposed segments. That is, in each segment the current differs in phase by 180° from the current in the opposite segment. Since the segments are connected in series, a single circuit is formed, whereby the respective currents are in conjunction.

The analogy with my invention, however, is that two respective segments, which are diametrically opposed, form two circuits. Since both circuits are in shunt there is a phase difference of 180° between the respective currents. The two circuits mentioned here, are the interior field circuit 32 and exterior field circuit 30. The above mentioned circuits bear an opposing relationship to the flow of primary flux. That is, the primary flux induces two opposing voltages.

At starting, the rotor circuit 52 is displaced 45° from field circuits 32 and 30 respectively. The current of circuit 32 is of the same phase as the rotor current 52. Therefore, the rotor current 52 is attracted by the current in field circuit 32. However, the current in field circuit 30 differs in phase by 180° from the above mentioned currents. Therefore, the current in circuit 30 repels the rotor current 52. The actions of these currents are mechanically conjunctive. In other words, the electrical pulsations occurring in circuits 32, 52, 30 are automatically synchronized, since these secondary currents are generated simultaneously by the same source, namely, the primary electro-magnets 12, 19. When a suitable condenser is connected in series with the primary circuit, the starting current is thereby reduced to a minimum, without any sacrifice in torque. When full speed is attained, the condenser increases the power factor, thereby increasing the relative output.

To produce starting torque, ordinary single phase induction motors utilize two magnetic fluxes, the respective axes of which extend at right angles. Furthermore, these must be dephased. However, in large horse power ratings there is no appreciable starting torque. This is due to the opposing actions of the respective fluxes.

In other words, there are two opposing forces at work. These are respectively the "motor action" and the "dynamo reaction" (reference is to motors employing a short circuited rotor). My single phase induction motor can start under load at the largest horse power ratings. A unique principle is utilized here, the mechanical reaction between magnet and electric current whereby the opposing force is eliminated. This is due to the fact that a magnet and electric current will react mechanically only at right angles to the magnetic lines of force. Due to the fact that field circuits 32 and 30 are displaced 45° from magnetic poles 22, 24 and 26, 28 the induced currents from field circuits 32 and 30 will move in a direction which is more or less parallel to the magnetic lines of force from poles 22, 24 and 26, 28. By moving toward the source of magnetism instead of at right angles, no opposing mechanical reaction will occur between the above mentioned currents and magnets. This in sharp contrast to ordinary single phase induction motors which utilize either two electric currents or two electro-magnets the respective fluxes of which are displaced 90°. The resulting action and reaction therefore allows no starting torque. In other words, my motor utilizes a magnet and an electric current to eliminate "dynamo reaction" while allowing a "motor action" to produce starting torque.

While I have shown and described a preferred form of my invention, it will be understood that variations in details of form may be made without departure from the invention as defined in the appended claims.

I claim:

1. In a single phase induction motor comprising a cylindrical rotor, a single stationary primary circuit element including means forming a magnetic path extending parallel to the axis of said rotor, said rotor being supported within said primary circuit element, said rotor forming a secondary circuit element, additional secondary circuit elements extending parallel to the said axis and adjacent the exterior of said rotor, said additional circuit elements being stationary, all of said circuit elements being inductively coupled, each of said stationary circuit elements having a perimeter extending a substantially uniform distance from the exterior of said rotor throughout their lengths, one of said additional circuit elements having a perimeter less than that of said primary circuit element and the other of said additional circuit elements having a perimeter greater than that of said primary element.

2. A single phase motor having a rotor, said rotor comprising an iron wheel attached to a shaft, an iron cylinder mounted on said wheel, a copper cylinder enclosing said iron cylinder and iron bolts extending radially through said rotor, a stationary primary circuit element, said rotor being supported within said primary circuit element, secondary circuit elements extending parallel to the axis of said rotor, said secondary circuit elements being stationary, all of said stationary elements being inductively coupled with said rotor.

3. An induction motor comprising a rotor, a stationary primary circuit stator segments having pole faces projecting radially of said rotor toward said rotor, each of said segments being U shaped and receiving one end of said rotor with the bight of each segment being spaced from and facing its adjacent end of said rotor, and the legs of the U shaped segments extending parallel to the axis of said rotor, stationary secondary circuits each comprising elements extending parallel to the axis of said rotor and adjacent the surface of said rotor, said circuits being inductively coupled with said rotor.

4. A motor comprising a rotor having an iron cylinder and a copper cylinder fastened one on the other, a stationary primary element, stationary secondary circuit elements spaced from the rotor and each extending parallel to the axis of said rotor, said circuits being inductively coupled with said rotor, and means for connecting one of said circuits to a current source.

5. An electric motor comprising a stationary primary circuit element of rectangular shape and a secondary circuit, said secondary circuit including a rotor, said element having portions extending parallel to the axis of said rotor, and secondary circuit elements comprising stationary means of rectangular shape defining flux paths having portions extending parallel to and portions extending radially of the axis of rotation of said rotor, said primary circuit and said secondary circuit being inductively coupled, one of said secondary circuit elements having a perimeter less than that of said primary circuit element, the other of said second circuit elements having a perimeter greater than that of said primary circuit element.

6. An induction motor comprising a rotor including concentrically arranged cylinders, one of said cylinders being formed of copper, the other being formed of iron, a first stationary secondary circuit element having portions extending longitudinally parallel to the axis of rotation of said rotor and adjacent the outer surface thereof, primary stator elements formed by a core and electrical windings and having portions extending parallel to said axis and adjacent the outer surface of said rotor and parallel to said secondary circuit element, and an additional stationary secondary circuit element extending parallel to said stator elements, said additional secondary circuit element having portions extending longitudinally parallel to the axis of rotation of said rotor adjacent to the outer surface of said rotor and at an angle of substantially 90° transversely of said axis with respect to the first mentioned portions, said circuit elements being inductively coupled with said motor.

7. A motor comprising a rotor formed of a magnetic material, a stationary primary circuit element of rectangular shape extending around said rotor and operable to induce currents in said rotor, a stationary secondary circuit element having portions extending longitudinally of said rotor and at an angle of approximately 45° transversely of the axis of said rotor with respect to said primary circuit, and an additional stationary secondary circuit element extending longitudinally of said rotor and at an angle of approximately 90° transversely of said axis with respect to the first mentioned secondary circuit element, said circuit elements being inductively coupled with said rotor.

8. A motor comprising a stationary primary circuit element of rectangular shape, a rotor having a flux path for flux generated in said primary, said rotor being within the rectangle formed by said element, two stationary secondary circuit elements extending parallel to said primary circuit element for a substantial portion of the latter element and lying at respective angles of approximately 45° transversely of the axis of said rotor with respect to said primary circuit element, said secondary circuit element constituting closed circuits, said circuit elements being inductively coupled with said rotor.

9. A motor comprising a stationary primary circuit element of rectangular shape, a movable secondary circuit element comprising a rotor having a flux path for flux generated by said primary circuit element, a stationary secondary circuit element extending parallel to said primary circuit element for a substantial distance, said stationary circuit element being at an angle of approximately 45° transversely of the axis of said rotor with respect to said primary element and constituting a closed circuit, an additional stationary secondary circuit element extending substantially parallel to said primary circuit element, said additional element being at an angle of approximately 90° transversely of the axis of said rotor with respect to the first mentioned secondary circuit element, said circuit elements being inductively coupled.

10. A motor comprising a rotor, a stationary primary circuit element comprising two U-shaped segments each receiving one end of said rotor, a stationary secondary circuit element having portions extending parallel to said primary segments and the axis of rotation of said rotor, an additional stationary secondary circuit elements disposed at an angle transversely of said axis with respect to the first mentioned secondary circuit element, said additional element having portions extending parallel to the perimeter of said rotor and to said primary circuit segments, said circuit elements being inductively coupled with said rotor.

11. An induction motor comprising a rotor formed of two concentrically arranged cylinders, one of which is of a material of high conductivity, the other of which has a low reluctance, members extending laterally of the axis of said cylinders, said members interconnecting said cylinders and forming flux paths extending radially of said cylinders.

12. An induction motor comprising a rotor, a rectangular stationary primary circuit element and two stationary secondary field circuit elements, one of the latter forming an interior field circuit with respect to the other of the latter, each of said secondary circuit elements having portions extending parallel to the axis of rotation of said rotor with the said portions of one of said circuit elements extending at an angle transversely of the axis of said rotor with respect to the portions of the other of said circuit elements, said circuit elements being inductively coupled with said rotor, said rotor being within said rectangular primary circuit element.

13. An induction motor comprising a rotor having elements of a low reluctance forming a flux path, a rectangular stationary primary circuit element and a pair of stationary secondary field circuit elements comprising portions extending parallel to the exterior of said rotor and each other, the said portions of one of said circuit elements being disposed at an angle of substantially 90° transversely of the axis of said rotor with respect to said portions of the other of said secondary circuit elements, said circuit elements being inductively coupled with said rotor, said rotor being within said rectangular circuit element.

14. An induction motor having a rotor and a stator comprising means forming a stationary primary magnetic circuit of rectangular shape, a movable secondary circuit element and two stationary secondary circuit elements, one of said secondary circuit elements having a perimeter shorter than the inner perimeter of said means forming said primary circuit, the other of said secondary circuits having a perimeter greater than the outer perimeter of said means forming said primary circuit, said circuit and said circuit elements being inductively coupled.

References Cited in the file of this patent

UNITED STATES PATENTS

| | | |
|---|---|---|
| 444,188 | Van Depoele | Jan. 6, 1891 |
| 471,155 | Thompson | Mar. 22, 1892 |
| 543,223 | Trudeau | July 23, 1895 |
| 561,144 | Trudeau | June 2, 1896 |
| 562,686 | Wightman | June 23, 1896 |
| 1,893,756 | Bowers | Jan. 10, 1933 |